United States Patent [19]

Budge

[11] 3,982,766
[45] Sept. 28, 1976

[54] WIND-PROPELLED SKATEBOARD
[76] Inventor: James D. Budge, 2028 Euclid St., Santa Monica, Calif. 90405
[22] Filed: Sept. 29, 1975
[21] Appl. No.: 617,298

[52] U.S. Cl. .................................. 280/1; 114/39; 180/2; 280/11.37 S; 280/87.04 A
[51] Int. Cl.² ......................................... B62B 3/00
[58] Field of Search .............. 280/11.37 S, 7.13, 1, 280/16, 213, 87.04 A, 87.04 R; 180/1 FV, 1 P, 2; 114/39, 90, 91; 115/1 R, 1 C

[56] References Cited
UNITED STATES PATENTS

| | | | |
|---|---|---|---|
| 604,180 | 5/1898 | Todd | 180/2 |
| 3,349,741 | 10/1967 | Herbst | 114/39 |
| 3,455,261 | 7/1969 | Perrin | 114/39 |
| 3,487,800 | 1/1970 | Schweitzer et al. | 114/39 |
| 3,572,740 | 3/1971 | Rypinski | 280/16 |
| 3,858,542 | 1/1975 | Lenoble | 114/39 |
| 3,895,597 | 7/1975 | Olevsky | 114/39 |

FOREIGN PATENTS OR APPLICATIONS

| | | | |
|---|---|---|---|
| 1,175,929 | 4/1959 | France | 280/213 |
| 460,111 | 11/1913 | France | 180/2 |

OTHER PUBLICATIONS
"Sail Skating," Surfing Magazine, Dec./Jan. 1975–1976, p. 25.

Primary Examiner—M. H. Wood, Jr.
Assistant Examiner—David M. Mitchell
Attorney, Agent, or Firm—W. Edward Johansen

[57] ABSTRACT

The invention is a wind-propelled skateboard which includes a body member having roller bearing wheels adapted for transporting a skateboarder over a concrete or asphalt surface, a mast, which is detachably coupled to the body member in such a manner that it is substantially free from pivotal restraint, a boom coupled to the mast by a hinge, and a sail coupled to both the mast and the boom.

10 Claims, 10 Drawing Figures

U.S. Patent    Sept. 28, 1976    Sheet 1 of 2    3,982,766
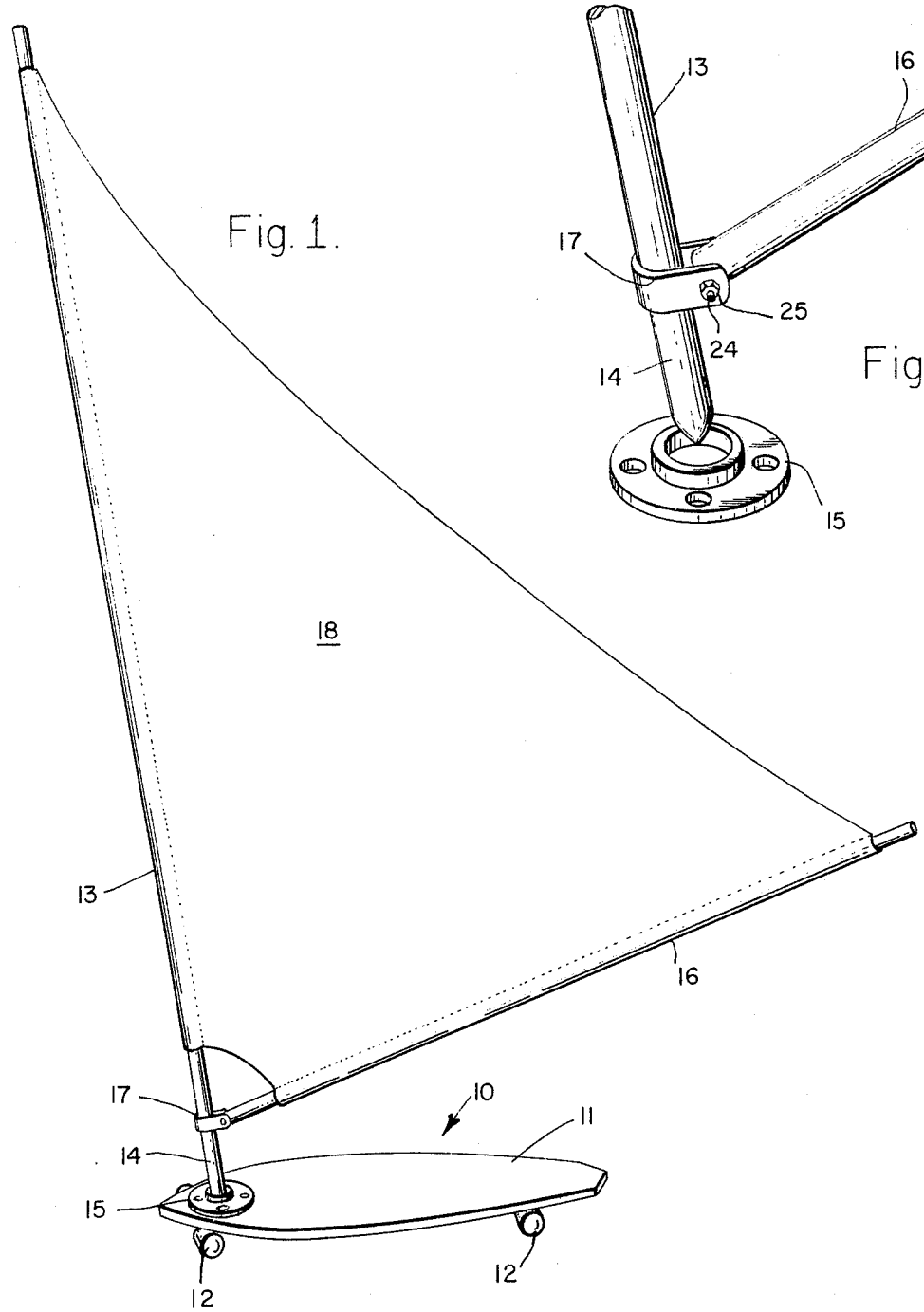
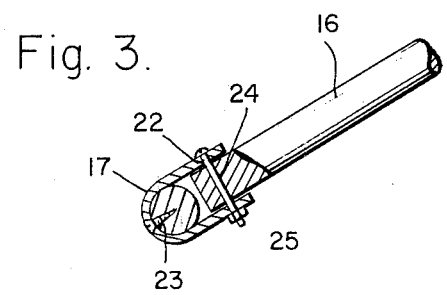

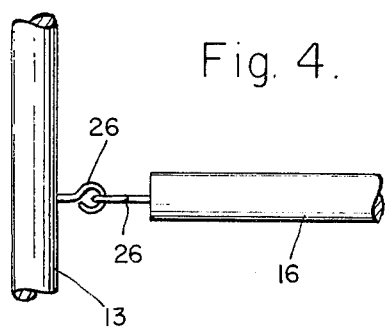
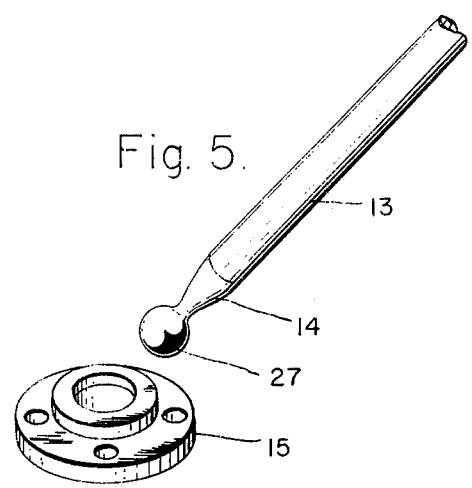
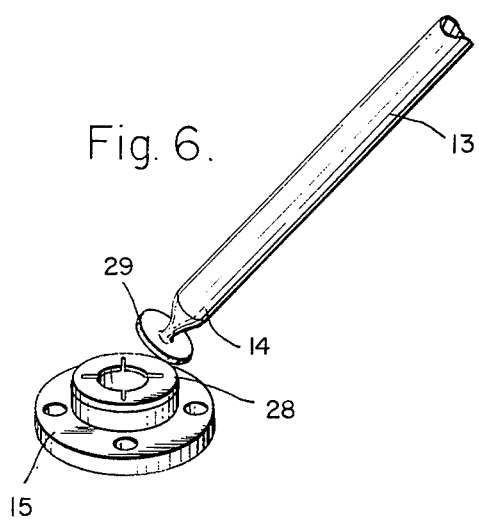
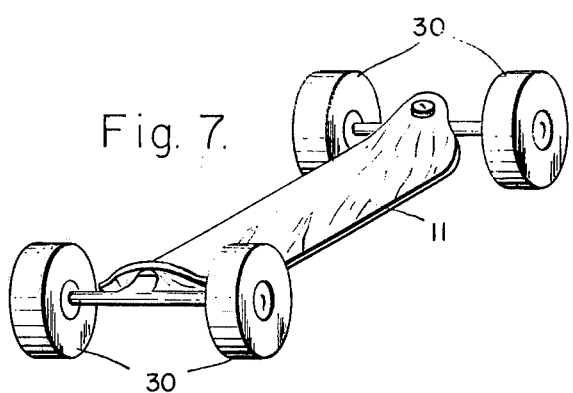
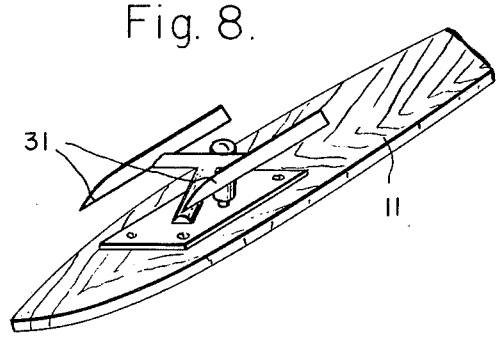
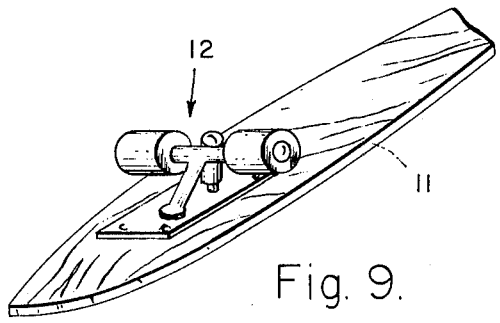
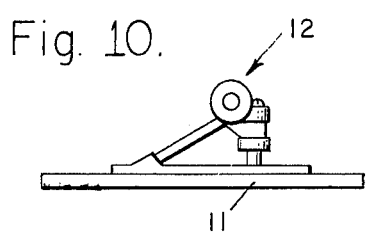

WIND-PROPELLED SKATEBOARD

BACKGROUND OF THE INVENTION

Field of the Invention

The invention relates to a wind-propelled apparatus, and more particularly to a wind-propelled skateboard.

2. Description of the Prior Art

Wind-propelled vehicles have been known to man since the Phoenicians first navigated their sail boats in the Mediterranean Ocean. Their sail boats included a hull with a deck, a mast joined to the deck of the hull, a boom coupled to the mast, and a sail attached to the mast and the boom. There have been many improvements over these sailboats, but the basic elements have remained the same.

In 1970 a wind-propelled surfboard or windsurfer was introduced to the water-sporting world. The wind propelled surfboard is the subject of U.S. Pat. No. 3,487,800, entitled Wind-propelled Apparatus, issued to Hoyle Schweitzer and James Drake on Jan. 6, 1970. The wind-propelled apparatus includes a mast which is universally mounted on a craft and which supports a boom and a sail, the position of the mast and sail being controllable by a user on the craft, but being substantially free from pivotal restraint in the absence of such control. The wind-propelled apparatus may also include a pair of curved booms, which are arcuately athwart the mast.

Wind-surfing has proved to be a popular outdoor sport, but it is limited to lakes, large rivers, or the ocean. A wind-propelled skateboard for use on land would also prove to be a popular sport, but such an apparatus would require a body member at least the size of a surfboard. A body member the size of a skateboard would not support the mast, the boom, and the sail of the wind-propelled apparatus. It has, therefore, been impractical to make a skateboard into a windskater or wind-propelled skateboard and retain the ride and control characteristics of a skateboard.

There are also other problems other than size restriction which arise in making the skateboard a wind-propelled apparatus. First, because the skateboard travels on virtually frictionless roller bearing wheels over a solid surface such as a concrete or asphalt, a skateboard tends to maintain its momentum thereby making stopping difficult. When the skateboarder does not wish to gain any more momentum, he must be able to immediately deflate his sail. By contrast the windsurfer has its momentum reduced constantly by the drag created beteenn the surfboard and the water; there is no need to deflate the sail of the windsurfer. Second, when a windskater gets into trouble or when a dangerous obstacle appears before him, he cannot be encumbered by a mast, a boom and a sail mounted on his skateboard, he must, instead, be able to discard them in order to concentrate fully on turning his skateboard away from the obstacles. Again by contrast, the windsurfer has neither a need to discard his mast, boom and sail nor a desire to do so; a windsurfer desiring to slow down may do so by letting go of the boom; the mast, which is universally mounted, the boom and the sail drop into the water remaining attached to the surfboard and the drag of the surfboard and the sail in the water reduces the momentum to a safe level.

According to the Schweitzer patent the difference between a windsurfer and a standard sailboat is that on a sailboat "a sail is provided on a mast that is rigidly secured to the craft in a vertical position .... The general effect of providing a sail on a normally sailless vehicle is to convert the vehicle into a water or landboat. Thus by securing a sail to a surfboard, the art of the surfboard and the enjoyment as such is lost and the skill normally required is no longer needed. Instead, one obtains the speed and feel of a light boat and need substantially only those skills appropriate to control a sailboat" (column 1, lines 32–43).

The universal mount of the windsurfer not only provides a wind-propulsion apparatus which preserves the original ride and control characteristics of the surfboard, but also provides an apparatus which is safe in that its sail and its mast be allowed to drop into the water, and which, after the sail and mast has been dropped in the water, may be easily retrieved. It is the presence of the universal mount which distinguishes a windsurfer from a sailboat.

A wind-propelled skateboard in accordance with the Schweitzer patent could not be made because a universal mount will not fit on a skateboard. Furthermore, a skateboarder steers a skateboard by using his feet to change his balance on the skateboard. Any wind-propulsion device must not be too bulky or too unweildy for the skateboarder to steer the skateboard.

SUMMARY OF THE INVENTION

In view of the foregoing factors and conditions characteristic of the prior art, it is a primary object of the present invention to provide a wind-propelled apparatus adaptable for use on either a concrete or asphalt surface or ice.

It is another object of the present invention to provide a wind-propelled apparatus whose mast is not universally mounted so that mast may be discarded if a dangerous obstacle appears in the windskater's path.

It is still another object of the present invention to adapt a sail, mast, and boom arrangement for a skateboard.

It is yet another object to provide a wind-powered skateboard that incorporates the prerequisite skills of skateboarding.

In accordance with an embodiment of the present invention a wind-propelled skateboard which includes a body member having a set of roller bearing wheels adapted for transporting a skateboarder over a concrete or asphalt surface, a mast which is detachably coupled to the body member in such a manner as to be substantially free from pivotal restraint, a boom, which is coupled to the mast by a hinge, and a sail coupled to the mast and to the boom.

The features of the present invention which are believed to be novel are set forth with particularity in the appended claims.

Other objects and many of the attendant advantages of this invention will be more readily appreciated as the same becomes better understood by reference to the following detailed description and considered in conjunction with the accompanying drawings in which like reference symbols designate like parts throughout the figures.

DESCRIPTION OF THE DRAWINGS

FIG. 1 is a perspective view of a wind-propelled skateboard constructed in accordance with the principles of the present invention.

FIG. 2 is a perspective view of a pivot cup, which is attached to the skateboard of FIG. 1, and an end portion of a mast before the mast has been detachably coupled to pivot cup. FIG. 2 is also a perspective view of a hinge which joins the mast to a boom.

FIG. 3 is a partial cross-sectional view of FIG. 2 taken along line 3—3 and shows a top view of the hinge.

FIG. 4 is a perspective drawing of a hinge formed by a pair of eyelet screws, joined together through their eyelets, and attached to the mast and the boom.

FIG. 5 is a perspective view of a pivot cup, which is attached to a skateboard, similar to the skateboard of FIG. 1, and an end portion of a mast which has a ball joint attached thereto before the mast has been detachably coupled to the pivot cup to form a ball and socket joint.

FIG. 6 is a perspective view of a pivot cup, similar to FIG. 5, which also has a pliable gasket attached, and an end portion of a mast, similar to FIG. 5, which has a washer adapted to squeeze through the gasket attached thereto.

FIG. 7 is a perspective view of a body member having a set of rubber wheels adapted to transport the body member over a solid surface.

FIG. 8 is a perspective view of a body member having a set of ice skate blades adapted to transport the body member over a solid ice surface.

FIG. 9 is a perspective view of the roller bearing wheels used in the preferred embodiment of the present invention.

FIG. 10 is a side view of the roller bearing wheels shown in FIG. 9.

DESCRIPTION OF THE PREFERRED EMBODIMENT

The present invention can best be understood by referring to FIG. 1 wherein a perspective view of a wind-propelled skateboard 10 is shown. The wind-propelled skateboard 10 includes a body member 11 adapted to transport a user over a solid surface, a set of roller bearing wheels 12 mounted on the body member 11, a mast 13 having a botton end 14, a pivot cup 15 mounted on the body member 11, a boom 16, a hinge 17 mounted on the mast 13 and coupled to the boom 16, a sail 18 attached to both the mast 13 and the boom 16. The end portion 14 of the mast 13 is detachably coupled to the pivot cup 15 when it is inserted into the pivot cup 15 and held there by the user. The prior art wind-propelled apparatus had its mast joined to the body member by a universal joint, which according to the patent describing it, is essential. It is essential in the wind-propelled skateboard that the mast 13 be detachably coupled in order for the user to avoid obstacles in his path. If the wind-propelled skateboard 10 had its mast 13 coupled to the body member 11 by a universal joint it could not be discarded in an emergency.

The pivot cup 15 provides a socket for the end portion 14 of the mast to be detachably coupled to the body member 11 in such a manner that the mast 13 is substantially free from pivotal restraint. The absence of pivotal restraint enables the user to manuever the wind-propelled skateboard 10.

Referring now to FIG. 2 wherein the mast 13 is shown detached from the pivot cup 15 the hinge 17 couples the boom 16 to the mast so that the boom 16 has 90° to 180° of unrestricted, pivotal motion about the hinge 17. The hinge 17 is anchored to the mast 13 and has no freedom of movement about the mast 13.

Referring to both FIG. 2 and FIG. 3 the hinge 17 is a u-shaped fitting having a hole 21 drilled in its base and a pair of holes 22 drilled in its sides, the holes 22 being oppositely disposed to each other. The u-shaped fitting 17 is mounted to the mast 13 by a screw 23. The boom 16 is coupled to the u-shaped fitting 17 by a nut 24 and a screw 25. Referring to FIG. 4 an alternative embodiment of the hinge 17 could include a pair of eyelet screws 26, which are joined together through their eyelets.

Referring now to both FIG. 5 and FIG. 6 two other embodiments of the present invention are shown. The first of which provides a ball joint 27 to the end portion 14 of the mast 13 which then forms a ball and socket joint with the pivot cup 15 when the mast is detachably coupled to the body member 11. The second of which providing a pliable gasket 28 coupled to the pivot cup 15 and a washer 29 adapted to squeeze through the gasket 21 attached to the end portion 14 of the mast 13.

Referring now to FIG. 7 the body member 11 may also include a set of rubber wheels 30 mounted thereon and adapted to transport the user over a solid surface, such as a dirt surface, an asphalt surface or a concrete surface. In still another embodiment the body member 11 may include a set of ice skating blades 31 as shown in FIG. 8 adapted to transport the user over a solid ice surface.

FIG. 9 and FIG. 10 are figures illustrating the mounting of the roller bearing wheels on the body member 11.

The new and unique features of wind-propelled skateboard 10 are the devices used to detachably couple the mast 13 to the body member 11 and to hinge the boom 16 to the mast 13 so that it has at least 90° of unrestricted, pivotal movement about the hinge 17. The unrestricted, pivotal movement is limited by the sail when it becomes taut. The wind-propelled skateboard is manuevered by pivoting the mast 13 within the pivotal cup 15 so that the sail 18 may catch the wind and by hinging the boom 16 about the hinge 17 thereby increasing or decreasing the surface area of the sail 18. Under normal conditions of use a user may stop or slow down the wind-propelled skateboard by folding the boom 16 and the sail 18 against the mast 13 and removing the mast 13 from the pivot cup 15. When an emergency occurs, such as a dangerous obstacle in his path, the user may detach the mast 13 and discard the mast 13, the boom 16, and the sail.

Until the present invention there has been no wind-propelled skateboard because teh other wind-propulsion devices were too bulky to fit on a skateboard and it was too dangerous to couple the mast to the skateboard. The present invention overcomes these problems by providing a detachably coupled mast, a boom hinged to themast, and a sail which are light enough in weight to be mounted on a skateboard. Furthermore the inventor has found that most of the wind's energy is transmitted through the body of the user and not through the mast into the pivot cup. This discovery enabled him to detachably couple the mast to the body member so that the mast could be removed while the wind propelled skateboard is in motion.

Other wind-propelled apparatuses do not require a hinged boom because speed is controlled by positioning the sail and turning is controlled by a rudder. In the wind-propelled skateboard the hinged boom is necessary not only to vary speed, but also to allow the user to change his body positions in order to steer and maneuver the skateboard without letting go of the boom. The user may also reverse his direction by switching his hands on the boom and mast without stopping, if he can maintain his balance. The user must therefore have all the prerequisite skills of a skateboarding user in order to windskate.

From the foregoing it can be seen that a wind-propelled skateboard has been described. It should be noted that the wind-propelled skateboard has not been drawn to scale and distances of and between the figures are not to be considered significant.

Accordingly, it is intended that the foregoing disclosure and showings made in the drawings shall be considered only as illustrations of the principles of the invention.

What I claim, is:

1. A wind propelled apparatus, comprising:
   a. a body member adapted to transport a user in a standing or crouching position over a solid surface and a surface contacting means coupled to said body member so that said body member is adapted to move over a solid surface;
   b. a mast which the user holds in one of his hands;
   c. means for detachably coupling said mast to said body member in such a manner that said mast is substantially free from pivotal restraint about a plane parallel to the horizontal plane of said body member and is also able to articulated throughout all transverse and longitudinal vertical planes about said coupling means;
   d. a boom which is held in positon by the user with his other hand;
   e. hinging means for coupling said boom to said mast so that said boom has 90° of unrestricted, pivotal motion in a vertical plane about said hinging means; and
   f. a sail coupled to said mast and to said boom.

2. A wind-propelled apparatus according to claim 1 wherein said hinging means comprises:
   a. a u-shaped metal fitting having a hole drilled in its base and a pair of holes drilled in its sides, said pair of holes being disposed opposite to each other, said u-shaped fitting attached to said mast; and
   b. means for coupling said boom to said fitting.

3. A wind-propelled apparatus according to claim 1 wherein said hinging means comprises a pair of eyelet screws, which are joined together through their eyelets, one of said eyelet screws being attached to said mast and and the other of said eyelet screws being attached to said boom.

4. A wind-propelled apparatus according to claim 1 wherein said detachably coupling means comprises:
   a. a pivot cup attached to said body member; and
   b. an end piece adapted to be inserted into said pivot cup and attached to said mast.

5. A wind-propelled apparatus according to claim 4 wherein said end piece is a ball attached to said mast and said pivot cup forms a socket such that when said ball is inserted into said socket a detachable ball and socket joint is formed.

6. A wind-propelled apparatus according to claim 1 wherein said detachably coupling means comprises:
   a. a pivot cup attached to said body member;
   b. a pliable gasket coupled to said pivot cup; and
   c. a metal washer attached to said mast, said washer adapted to be inserted into said pivot cup through said gasket.

7. A wind-propelled apparatus according to claim 1 wherein in said body member is adapted for transporting a user over a concrete or asphalt surface and comprises:
   a. a board;
   b. a set of roller bearing wheels coupled to said board.

8. A wind-propelled apparatus according to claim 1 wherein said body member is adapted for transporting a user over a gravel, dirt or grassy surface and comprises:
   a. a board; and
   b. a set of rubber wheels coupled to said board.

9. A wind-propelled apparatus according to claim 1 wherein said body member is adapted for transporting a user over icy surface and comprises:
   a. a board; and
   b. a set of ice-skating blades coupled to said board.

10. A wind-propelled skateboard according to claim 1 wherein said body member has roller bearing wheels coupled to it, said wheels being adapted to transport a wind-skater over a concrete or asphalt surface, and also has attached a pivot cup, wherein said mast has attached an end piece adapted to be inserted into said pivot cup, and wherein said hinging means comprises:
   a. a u-shaped metal fitting having a hole drilled in its base and a pair of holes drilled in its sides, said pair of holes being disposed opposite to each other, said u-shaped fitting attached to said mast; and
   b. means for coupling said boom to said fitting.

* * * * *